(12) United States Patent
Vogler

(10) Patent No.: US 6,868,106 B1
(45) Date of Patent: Mar. 15, 2005

(54) RESONATOR OPTICS FOR HIGH POWER UV LASERS

(75) Inventor: Klaus Vogler, Goettingen (DE)

(73) Assignee: Lambda Physik AG, Goettingen (DE)

( * ) Notice: Subject to any disclaimer, the term of this patent is extended or adjusted under 35 U.S.C. 154(b) by 34 days.

(21) Appl. No.: 10/001,954

(22) Filed: Oct. 31, 2001

Related U.S. Application Data

(60) Continuation-in-part of application No. 09/925,040, filed on Aug. 7, 2001, now Pat. No. 6,466,598, which is a division of application No. 09/317,695, filed on May 24, 1999.

(60) Provisional application No. 60/244,744, filed on Oct. 31, 2000, provisional application No. 60/126,435, filed on Aug. 18, 1998, and provisional application No. 60/155,188, filed on Jun. 4, 1998.

(51) Int. Cl.[7] .......................... H01S 3/22; H01S 3/223; H01S 3/097; H01S 3/09; H01S 3/08

(52) U.S. Cl. ........................ 372/57; 372/55; 372/59; 372/60; 372/87; 372/90; 372/103

(58) Field of Search ........................ 372/57, 55, 59, 372/60, 86, 92, 98, 99, 58, 87, 90, 103, 108, 105.57, 107

(56) References Cited

U.S. PATENT DOCUMENTS

| | | | | |
|---|---|---|---|---|
| 4,341,873 A | * | 7/1982 | Robinson et al. | 501/40 |
| 5,062,116 A | * | 10/1991 | Christensen | 372/61 |
| 5,200,970 A | * | 4/1993 | Klopotek | 372/55 |
| 5,594,753 A | * | 1/1997 | Frey et al. | 372/57 |
| 6,055,259 A | * | 4/2000 | Frey et al. | 372/57 |
| 6,301,284 B1 | * | 10/2001 | Newman | 372/109 |
| 6,345,065 B1 | * | 2/2002 | Kleinschmidt et al. | 372/57 |
| 6,392,743 B1 | * | 5/2002 | Zambon et al. | 355/69 |
| 6,408,260 B1 | * | 6/2002 | Watts et al. | 702/188 |
| 6,421,365 B1 | | 7/2002 | Kleinschmidt et al. | 372/108 |
| 6,463,086 B1 | * | 10/2002 | Stamm et al. | 372/20 |

(List continued on next page.)

FOREIGN PATENT DOCUMENTS

| JP | 06250015 A | * | 9/1994 | G02B/5/26 |
|---|---|---|---|---|
| WO | WO 2071556 A2 | * | 9/2002 | |

OTHER PUBLICATIONS

M.J. Dodge, "Refractive properties of magnesium fluoride," *Applied Optics*, vol. 23, No. 12, Jun. 15, 1984, pp. 1980–1985.

A.L. Bloom, "Modes of a laser resonator containing tilted birefringent plates," *Journal of the Optical Society of America*, vol. 64, No. 4, Apr. 1974, pp. 447–452.

U.S. Appl. No. 09/883,128, filed Jun. 15, 2001, entitled "Line Narrowing of Molecular Fluorine Laser Emisson," by Sergei Govorkov et al., 55 pages in length.

U.S. Provisional Appl. No. 60/280,398, filed Mar. 29, 2001, entitled "Narrow Band Excimer of Molecular Fluorine Laser Having an Output Coupling Interferometer," by Juergen Kleinschmidt et al., 61 pages in length.

*Primary Examiner*—Minsun Oh Harvey
*Assistant Examiner*—Armando Rodriguez
(74) *Attorney, Agent, or Firm*—Stallman & Pollock LLP

(57) ABSTRACT

An excimer or molecular fluorine laser system includes a discharge chamber filled with a laser gas mixture at least including a halogen-containing molecular species and a buffer gas, multiple electrodes within the discharge chamber connected to a discharge circuit for energizing the gas mixture, and a resonator for generating a laser beam including an optical component made of $MgF_2$. The optical component made of $MgF_2$ has been previously cleaved along a predetermined plane, such that the refractive indices of the birefringent $MgF_2$ material for orthogonal polarization components of the beam are either at least approximately equal so that the polarization of the beam due to the influence of the birefringent nature of the $MgF_2$ material is not substantially reduced, or are approximately maximum so that at least a portion of one of the components is rejected by the resonator so that the polarization of the beam is increased due to the birefringent nature of the $MgF_2$.

25 Claims, 4 Drawing Sheets

U.S. PATENT DOCUMENTS

| | | | | |
|---|---|---|---|---|
| 6,477,187 B1 | * | 11/2002 | Kleinschmidt et al. | 372/19 |
| 6,553,042 B2 | * | 4/2003 | Shio et al. | 372/9 |
| 2002/0015432 A1 | * | 2/2002 | Kleinschmidt et al. | 372/57 |
| 2002/0041616 A1 | * | 4/2002 | Kleinschmidt et al. | 372/57 |
| 2002/0141474 A1 | * | 10/2002 | Kleinschmidt et al. | 372/108 |
| 2002/0182863 A1 | * | 12/2002 | Chiba | 438/689 |

* cited by examiner

RESONATOR OPTICS FOR HIGH POWER UV LASERS

PRIORITY

This application claims the benefit of priority to U.S. provisional patent application No. 60/244,744, filed Oct. 31, 2000, and is a Continuation-in-Part application claiming the benefit of priority to United States patent application Ser. No. 09/925,040 (which application is hereby incorporated by reference), filed Aug. 7, 2001 now U.S. Pat. No. 6,466, 598, which is a divisional of U.S. patent application Ser. No. 09/317,695, filed May 24, 1999, which claims the benefit of priority to United States provisional patent applications no. 60/126,435, filed Aug. 18, 1998 and 60/155,188, filed Jun. 4, 1998.

BACKGROUND

1. Field of the Invention

The invention relates to excimer and molecular fluorine laser systems, and particularly including at least one optical component made of $MgF_2$.

2. Description of the Related Art

Line-narrowed excimer lasers are applied in the field of photolithography for production of integrated circuits. Achromatic imaging optics for this wavelength region are difficult to produce. For this reason, line-narrowed excimer laser radiation is generated for use in photolithographic applications in order to prevent errors caused by chromatic aberrations. Exemplary bandwidths for different imaging systems are tabulated in Table 1 for the excimer laser wavelengths 248 nm (KrF laser), 193 nm (ArF laser), and for the molecular fluorine laser wavelength 157 nm ($F_2$-laser).

TABLE 1

| imaging optics | 248 nm | 193 nm | 157 nm |
|---|---|---|---|
| refractive optics: | 0.4–0.6 pm | 0.3–0.6 pm | 0.1 pm |
| catadioptics | 20–100 pm | 10–40 pm | approx. 1 pm |

Internal optical resonator components may be made of $CaF_2$, particularly for the ArF laser emitting around 193 nm and the $F_2$ laser emitting around 157 nm. This relates to resonator optics such as mirrors or prisms, as well as to the laser tube windows that are also a part of the beam path within the resonator. It is recognized in the present invention that when such excimer or molecular fluorine laser is operated at high power (e.g., greater than 40 Watts)/high repetition rate (e.g., 2–4 kHz or more), as is desired for increasing throughput, then the tube windows, which include bulk material typically without coatings, tend to crack more easily in the particular case wherein the bulk material comprises $CaF_2$. It may be that very small residual absorption within the $CaF_2$ material or on the surface of the $CaF_2$ substrate causes a strong thermal gradient and stress that the $CaF_2$ component window is unable to withstand, such that the window then cracks.

It is further recognized in the present invention, that if the bulk material of the windows comprises $MgF_2$, which is also tetragonal and is a material desirable for production at high purity and in large volumes, then the windows would be more suitable for withstanding high intensity and average power. In experiments, the $MgF_2$ windows were in fact more resistant to cracking or complete destruction than $CaF_2$ windows. The combination of the thermal and mechanical properties (hardness) of the $MgF_2$ material is recognized herein as being superior for this application than $CaF_2$. Even if the overall purity of the $MgF_2$ material to be used is not as mature as the $CaF_2$, the $MgF_2$ is still advantageously more durable than $CaF_2$ in a high power resonator.

A difficulty with using $MgF_2$ in narrowband lithography type excimer or molecular fluorine lasers, however, is that $MgF_2$ may typically have a negative effect on the degree of polarization of the generated beam, while it is desired that these narrowband lasers have a high degree of linear polarization of the laser output beam, e.g., greater than 95%. This effect is due to $MgF_2$ being strongly birefringent, in contrast to $CaF_2$, which may typically degrade the polarization of the beam as it traverses the $MgF_2$ bulk material, which results ultimately in an evidently lower output energy for narrow band laser operation. For this reason, $MgF_2$ has been typically avoided and $CaF_2$ is the material of choice for sub-200 nm optical components. It is desired to circumvent this problem and achieve the durability benefits of forming high power, sub-200 nm laser optical components from $MgF_2$. It is recognized in the present invention, in this regard, that the negative effect on polarization of the birefringent $MgF_2$ material occurs particularly when the optical axis of the $MgF_2$ component is oriented at an arbitrary angle to the beam.

SUMMARY OF THE INVENTION

In view of the above, an excimer or molecular fluorine laser system includes a discharge chamber filled with a laser gas mixture at least including a halogen-containing molecular species and a buffer gas, multiple electrodes within the discharge chamber connected to a discharge circuit for energizing the gas mixture, and a resonator for generating a laser beam including an optical component made of $MgF_2$. The optical component made of $MgF_2$ has been previously cleaved along a predetermined plane.

In a first embodiment, the $MgF_2$ has been previously cleaved along a plane such that the refractive indices of the birefringent $MgF_2$ material for orthogonal polarization components of the beam are at least approximately equal so that the polarization of the beam is not substantially reduced due to the influence of the birefringent nature of the $MgF_2$ material. In this case, the $MgF_2$ material is preferably cut so that the beam traverses the $MgF_2$ material parallel to its optical axis, or the crystallographic c-axis.

In a second embodiment, the $MgF_2$ has been previously cleaved along a plane such that the refractive indices of the birefringent $MgF_2$ material for orthogonal polarization components differ, preferably by at least approximately a maximum amount, and the resonator in configured such that selected polarization component, e.g., the $\pi$-component which is in the plane of incidence with respect to one or more surfaces inclined at Brewster's angle, and which also corresponds to either of the extraordinary and ordinary rays based on the cleavage plane selected, is within its acceptance angle while that other of the polarization components is refracted outside of the acceptance angle of the resonator. In this second embodiment, the $MgF_2$ material is preferably cut so that the beam traverses the $MgF_2$ material perpendicular to its optical axis, or the crystallographic c-axis, wherein this optical axis may be inclined within or normal to the plane of incidence. When the optical axis is within the plane of incidence in this second embodiment, the $\pi$-polarization component corresponds to the extraordinary ray which is selected due to its being transmitted approximately 100% at the Brewster surface such that the resonator is configured to accept it, while the p-component corresponds to the ordinary ray which is not selected such that the resonator is configured to reject it. When the optical axis is perpendicular to the plane of incidence in this second embodiment, the π-polarization component corresponds to the ordinary ray which is selected due to its being transmitted approximately 100% at the Brewster surface such that the resonator is configured to accept it, while the ρ-component corresponds to the extraordinary ray which is not selected such that the resonator is configured to reject it.

According to either of the first and second embodiments, the polarization is not substantially reduced due to the birefringent nature of the $MgF_2$ material. According to the first embodiment, the polarization is substantially unaffected and according to the second embodiment, the polarization is actually increased due to the birefringent nature of the $MgF_2$ material and the advantageous cleaving of the $MgF_2$ to form the optical component(s) along a predetermined cleavage plane. Among the optical components that may be previously cleaved along a predetermined plane according to the first or second embodiments include one or both windows on the discharge chamber, an output coupler, a highly reflective (HR) mirror and/or a prism, and/or even plates of an etalon or other interferometric device, wavefront compensation optic, lens or other optic that may be used in a DUV/VUV resonator as understood by those skilled in the art. One or more apertures may be introduced into the resonator for defining the acceptance angle wherein the selected one of the ordinary and extraordinary rays is accepted and the other is rejected.

INCORPORATION BY REFERENCE

Figure 1:
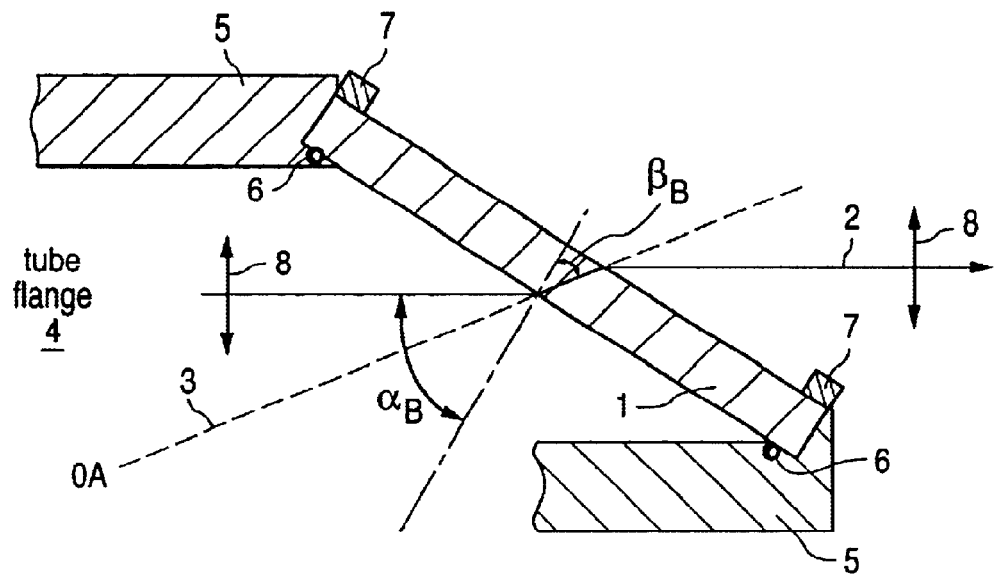
FIG. 1 schematically illustrates a laser beam transmitting a $MgF_2$ laser tube window within a resonator of an excimer or molecular fluorine laser system according to a first preferred embodiment.

What follows is a cite list of references which are, in addition to any references cited above in the background or priority sections or below in the detailed description of the preferred embodiments, and the background section itself, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 6,154,470, 6,157,662, 5,898,725, 6,181,724, 6,181,724 and 6,219,368;

U.S. patent applications Ser. Nos. 09/317,695, 09/244,554, 09/454,803, 09/482,698, 09/594,892, 09/602,184, 09/599,130, 09/694,206, 09/771,366, 09/738,849, 09/715,803, 09/718,809, 09/629,256, 091584,420, 09/883,127, 09/883,128, 09/923,770, 60/267,567, 60/296,898, 60/309,939, which are assigned to the same assignee as the present application;

Marilyn J. Dodge, "Refractive Properties of Magnesium Fluoride," Applied Optics, vol.23, no.12, 1984, pp.1980–1985;

U. Stamm, "Status of 157 nm The 157 Excimer Laser," International SEMATECH 157 nm Workshop, Feb. 15–17 1999, Litchfield, Ariz., USA;

T. Hofman, J. M. Hueber, P. Das, S. Scholler, "Prospects of High Repetition Rate F2 (157 nm) Laser for Microlithography", International SEMATECH 157 Workshop, Feb. 15–17 1999, Litchfield, Ariz., USA;

U. Stamm, I. Bragin, S. Govorkov, J. Kleinschmidt, R. Patzel, E. Slobodtchikov, K. Vogler, F. Voss, and D. Basting, "Excimer Laser for 157 nm Lithography", 24th International Symposium on Microlithography, Mar. 14–19, 1999, Santa Clara, Calif., USA;

Kakehata, M., et al., "CTUH 15 Experimental Study of Tunability of a Discharge Pumped Molecular Fluorine Laser," CLEO 90/Tuesday Poster, pp. 106–108;

T. Hofmann, J. M. Hueber, P. Das, S. Scholler, "Revisiting The F2 Laser For DUV microlithography", 24th International Symposium on Microlithography, Mar. 14–19, 1999, Santa Clara, Calif., USA;

W. Muckenheim, B. Ruckle, "Excimer Laser with Narrow Linewidth and Large Internal Beam Divergence", J. Phys. E: Sci. Instrum. 20 (1987) 1394;

Okada, et al., "Electronic Tuning of Dye Lasers by an Electrooptic Birefringent Fabry-Perot Etalon," Optics Communications, Vol. 14, No. 1 (May 1975);

Arnold Bloom, "Modes of a Laser Resonator Containing Tilted Birefringent Plates," JOSA, Vol. 64, No. 4 (April 1974);

G. Grunefeld, H. Schluter, P. Andersen, E. W. Rothe, "Operation of KrF and ArF Tunable Excimer Lasers Without Cassegrain Optics", Applied Physics B 62 (1996) 241; and W. Mueckenheim, "Seven Ways to Combine Two Excimer Lasers," reprinted from July 1987 edition of Laser Focus/Electro-Optics.

DETAILED DESCRIPTION OF THE PREFERRED EMBODIMENTS

The preferred embodiments described below set forth advantageous excimer or molecular fluorine laser systems that include optical components made of MgF$_2$ cut or cleaved in a predetermined way with regard to the optical axis of the material, and/or having its optical axis oriented at a predetermined orientation relative to the laser beam, so that the polarization of the beam is not substantially reduced due to the influence of the birefringent nature of the MgF$_2$ material. The optical axis, as referred to in this application, in the preferred material or the tetragonal MgF$_2$ lattice is the (001) direction, i.e., the crystallographic c-axis.

In particular embodiments, the refractive indices of the material for orthogonal polarization components of the beam are at least approximately equal due to the optical axis of the material being oriented approximately parallel to the beam path through the material, e.g., for MgF$_2$ laser tube windows, a partially reflecting output coupler, a prism, etalon or other interferometric device and/or a HR mirror substrate. In another embodiment, the optical axis is oriented approximately perpendicular to the beam path. In this latter embodiment, the resonator is configured to accept the selected polarization component, e.g., the π-component for Brewster surfaces which may correspond either to the extraordinary ray (e-ray) or ordinary ray (o-ray) depending on whether the optical axis of the MgF$_2$ material is oriented within or normal to the plane of incidence, respectively, and to reject the non-selected component, e.g., the ρ-component for Brewster surfaces which corresponds to the other of the o-ray and e-ray.

In the particularly preferred case of an excimer or molecular fluorine laser tube including one or two MgF$_2$ Brewster windows (see FIGS. 1–2 and corresponding description below), the window includes approximately parallel faces oriented such that the laser beam is incident at approximately Brewster's angle to a surface normal. The windows may be oriented at any angle within a range around Brewster's angle wherein the π-component is substantially transmitted at the entrance and exit surfaces of the window, and/or has a substantially greater transmittance at the surfaces of the window than the ρ-component, such that the beam becomes substantially polarized, e.g., greater than 95% and 97.5% or more depending on the application with which the laser beam is being used, after traversing a sufficient number of Brewster surfaces within the resonator. If an extra-cavity polarizer is also used, then the desired amount of intra-cavity polarization may be relaxed, and polarizing plates may be used in addition to the Brewster tube windows, and additional Brewster plates may be inserted into the resonator, and a prism or prisms may be have at least one surface oriented within the range described above around Brewster's angle.

At the same time, the window or windows is/are cut in a predetermined way such that, according to a first embodiment (see FIG. 1, and description below), the laser beam travels along or approximately parallel to the optical axis of the material, which is preferably the <001> direction for tetragonal MgF$_2$. In this case, the ordinary and extra-ordinary refractive indices are approximately the same, since it is recognized herein that the extraordinary refractive index varies between the ordinary refractive index no (1.461 for MgF$_2$) for rays traveling parallel to the optical axis and n$_e$ (1.475) for rays traveling perpendicular to the optical axis. This first embodiment provides the window(s) with the feature that the ordinary and extraordinary rays of the beam are not refracted differently due to the birefringent nature of the material, e.g., such as to split the beam into two orthogonal polarized and/or separately propagating beams.

According to a second embodiment (see FIGS. 2–3, and description below), the beam travels approximately perpendicular to the optical axis of the material, or within several degrees of perpendicular wherein the angular deviation between the e-ray and o-ray is sufficient that the unselected one is refracted outside of the acceptance angle of the resonator. When the accepted ray corresponds to the π-component that transmits the Brewster surface with substantially 100% efficiency, then the polarization is actually enhanced due to the birefringent nature of the MgF$_2$ material and the advantageous cleaving of the MgF$_2$ along a predetermined plane relative to its optical axis. When the MgF$_2$ is cleaved so that the optical axis is within the plane of incidence, and substantially perpendicular to the beam path according to this second embodiment, then the e-ray corresponds to the π-component and the resonator is configured to accept this e-ray/π-component and also such that the o-ray/ρ-component is refracted outside of the acceptance angle of the resonator. When the MgF$_2$ is cleaved so that the optical axis is normal to the plane of incidence, and substantially perpendicular to the beam path according to this second embodiment, then the o-ray corresponds to the π-component and the resonator is configured to accept this o-ray/π-component and also such that the e-ray/ρ-component is refracted outside of the acceptance angle of the resonator.

FIG. 1 schematically illustrates a laser beam transmitting a MgF$_2$ laser tube window 1 within a resonator of an excimer or molecular fluorine laser system, or other DUV/VUV laser system, e.g., a frequency quadrupled or quintupled Nd:YAG laser, according to a first preferred embodiment. FIG. 1 shows the window 1 and illustrates the beam path 2 of the beam that enters the MgF$_2$ material of the window at an incidence angle within the above-described range around Brewster's angle and more preferably at or very near Brewster's angle, traverses the MgF$_2$ material of the window in a direction substantially, approximately or at least approximately parallel to the optical axis 3 or the <001> or crystalloigraphic c-axis of the MgF$_2$ material, and exits the window at or around Brewster's angle. Note that wherever it is mentioned herein, including in the claims, that the beam path is substantially, approximately or at least approximately parallel to the optical axis, it is meant that the beam path forms an angle as low as zero with the optical axis and may be non-zero and within a range of angles wherein a small difference in refraction occurs between the ordinary and extraordinary rays which is small enough that the polarization of the beam is not substantially reduced due to the birefringent nature of the MgF$_2$ material. A tube flange 4 is shown serving as an optical mount for the window 1, wherein the metal frame 5 of the window flange 4 is specifically shown along with sealing o-rings 6 and metal rings 7. The linear polarization 8 of the beam corresponding to the π-polarization component in the plane of incidence with the Brewster window 1 is also illustrated in FIG. 1. The incidence angle $\alpha_B$ is illustrated in FIG. 1 and is preferably at or near Brewster's angle (=55°–56°), i.e., within the range described above for producing a substantially polarized beam after multiple passes through Brewster surfaces or otherwise polarizing intracavity and/or extracavity optical components. The internal Brewster angle $\beta_B$ is also shown in FIG. 1 which differs due to the refraction at the surfaces of the window 1.

According to this first preferred embodiment of a laser tube window 1 within a DUV/VUV laser resonator, wherein the beam path 3 is parallel to the optical axis of the MgF$_2$ material as the beam 2 traverses the window 1, the MgF$_2$ material should be cleaved at or near an angle $\beta_B$ relative to the optical axis or tetragonal c-axis. This angle $\beta_B$ can be derived from Brewster's law, i.e., $\tan \alpha_b$=refractive index, and Snell's law, i.e., refractive index=$(\sin\alpha_B/\sin\beta_B)$, or $\cos\alpha_B$=$\sin\beta_B$, wherein $\alpha_B$ is around Brewster's angle or around 55.74°, such that $\beta_B$ is around 34.26°, according to the preferred embodiment, while the $MgF_2$ may be cut at another angle within a range around this preferred angle of 34.26° wherein the benefits of the preferred embodiment are still substantially realized. That is, the normal to the surfaces of the Brewster window 1 form an angle at or around preferably 34.26° with the optical axis of the $MgF_2$ material.

Figure 2:
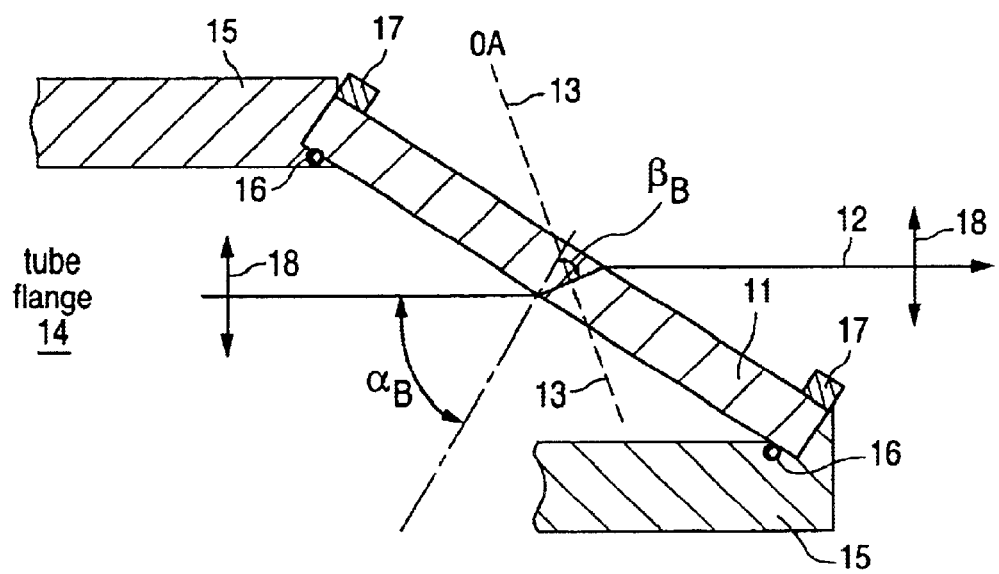
FIG. 2 schematically illustrates a laser beam transmitting a $MgF_2$ laser tube window within a resonator of an excimer or molecular fluorine laser system according to a second preferred embodiment.

FIG. 2 schematically illustrates a laser beam transmitting a $MgF_2$ laser tube window 11 within a resonator of an excimer or molecular fluorine laser system according to a second preferred embodiment. FIG. 2 shows a beam path 12 which is preferably perpendicular to the optical axis 13 of the $MgF_2$ material as the beam traverses the $MgF_2$ material of the window 11, a tube flange 14, metal frame 15, sealing o-rings 16, metal ring 17 and polarization 18 of the beam corresponding to the $\pi$-component in the plane of incidence of the Brewster surfaces of the window 11, each of which are preferably the same as described above with reference to FIG. 1. The difference between the window 11 of the second embodiment and the window 1 of the first embodiment is the plane along which the $MgF_2$ material is preferably cleaved in the second embodiment is rotated by 90° relative to the plane along which the $MgF_2$ material is cleaved in the first embodiment. The optical axis 13 remains within the plane of incidence, but is now perpendicular to the beam path 18 through the $MgF_2$ material of the window 11.

The ordinary refractive index no and the extraordinary refractive index ne for the beam traversing the window 11 in this second embodiment are different by at least approximately a maximum amount with respect to the $MgF_2$ material, i.e., no is around 1.461 and $n_e$ is around 1.475, wherein the ordinary and extraordinary refractive indices, $n_o$ and $n_e$ were each around 1.461 in the first embodiment. Note that wherever it is mentioned herein, including in the claims, that the ordinary and extraordinary indices, $n_o$ and $n_e$, respectively, differ by "at least approximately a maximum amount", it is meant that the indices $n_o$ and $n_e$ differ by an amount somewhere within a range up to the maximum amount such that enough difference in refraction occurs between the ordinary and extraordinary rays that one of the ordinary and extraordinary rays may be selected or accepted by the resonator and at least a not insubstantial portion of the other ray may be unselected or refracted outside of the acceptance angle of the resonator so that the effect tends to increase the polarization of the laser beam or at least so that the polarization of the beam is not substantially reduced due to the birefringent nature of the $MgF_2$ material. The $\pi$-polarization component 18 in this second embodiment shown in FIG. 2 corresponds to the extraordinary ray which is the selected component making up the beam 12. The ordinary ray is refracted at a different angle at the surfaces of the window 11 due to the difference in refractive index, and so forms a second beam that is parallel to and displaced a certain distance from the first beam including the selected component. At least an outer portion of this second beam may be selected out of the resonator, such as due to being blocked by an aperture or not being retro-reflected within the acceptance angle of the resonator by a resonator reflector, thus causing an increase in the overall polarization of the beam above that which is produced by Brewster surfaces of the window(s) 11, and/or any Brewster plates or prism surfaces or other polarization components, intra-cavity or extra-cavity.

It is noted that where any Brewster plates made of $MgF_2$ are used within the resonator for increasing the polarization, then that plate or those plates are preferably cleaved according to any of the first to third embodiments described herein, and the preferred resonators configured for rejecting at least an outer portion of the unselected polarization component according to the second and third embodiments when the $MgF_2$ is cleaved according to either of those embodiments. The same may apply to other optics that may be formed of $MgF_2$ such as plates of an etalon or other interferometric device (see U.S. patent applications Ser. Nos. 09/715,803 and 60/280,398, which are assigned to the same assignee as the present application and are hereby incorporated by reference), if the interferometric device is operated intracavity in transmissive mode between the resonator reflectors of the laser, and is disposed at an angle to the beam path (if the interferometric device such as an etalon is operated in reflective mode and serves as a resonator reflector so that the plates are substantially normal to the beam path, then the $MgF_2$ plates are preferably cleaved according the embodiment described with reference to the reflector schematically illustrated at FIG. 4 herein, i.e., such that the beam path is substantially parallel to the optical axis, and similarly if the laser tube windows are oriented so that the beam is nearly normal to the surfaces such as 5° or so). Any other optics that may be used with the preferred DUV/VUV laser system wherein the beam traverses a portion of the component that is formed of $MgF_2$, which may be preferred over $CaF_2$ for high power operation such as at 2–4 kHz or more, e.g., intracavity or extracavity attenuator, extracavity spectral filter, a transmissive layer or layers forming a grating, a dispersive prism, a polarization plate, a half- or quarter-wave plate, a focusing or imaging lens, a wavefront compensation plate or lens, a window on a beam path enclosure or imaging system, among others as understood by those skilled in the art, are preferably cleaved according to the preferred embodiments set forth herein.

Figure 3:
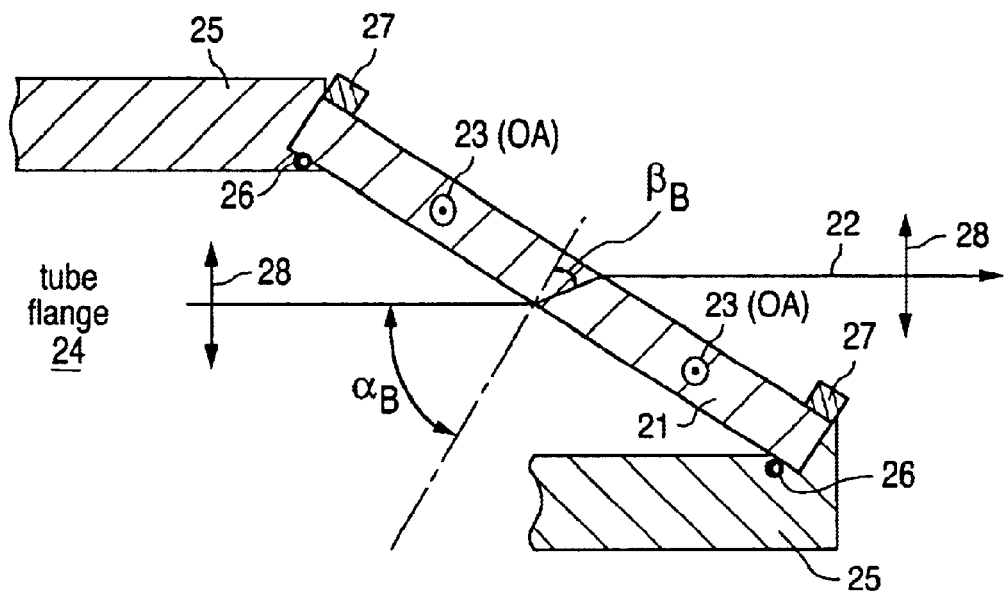
FIG. 3 schematically illustrates a laser beam transmitting a $MgF_2$ laser tube window within a resonator of an excimer or molecular fluorine laser system according to a second preferred embodiment.

FIG. 3 schematically illustrates a laser beam transmitting a $MgF_2$ laser tube window 21 within a resonator of an excimer or molecular fluorine laser system according to a second preferred embodiment. FIG. 3 shows a beam path 22 which is preferably perpendicular to the optical axis 23 of the $MgF_2$ material as the beam traverses the $MgF_2$ material of the window 21, a tube flange 24, metal frame 25, sealing o-rings 26, metal ring 27 and polarization 28 of the beam corresponding to the $\pi$-component in the plane of incidence of the Brewster surfaces of the window 21, each of which are preferably the same as described above with reference to FIGS. 1–2. The difference between the window 21 of FIG. 3 and the window 11 of FIG. 2 is that the optical axis is normal to the plane of incidence in FIG. 3 and is within the plane of incidence in FIG. 2. In each case, the difference between the ordinary and extraordinary refractive indices are maximum, and the discussion above relating to the second embodiment is incorporated here and not otherwise repeated for the resonator setup. For the embodiment of FIG. 3, the ordinary ray corresponds to the selected $\pi$-polarization component 28 of the beam.

In an alternative embodiment, the windows 1, 11, 21 can be cut, e.g., wherein the optical axis 3, 13, 23 is perpendicular to the window surfaces, or otherwise not substantially parallel or perpendicular to the beam path according to any of the first to third embodiments described above, i.e., not within the advantageous range set forth above. In this alternative embodiment, the windows 1, 11, 21 are aligned at an angle not equal to Brewster's angle, but still so that the polarization of the laser beam which is generated within the laser resonator transmits the window either parallel to the optical axis and plane of incidence (similarly to the first embodiment) or perpendicular to the optical axis and parallel or perpendicular to the plane of incidence (similarly to the second or third embodiments, wherein the description of those embodiments relative to the orientation of the polarization relative to the optical axis is incorporated here and not otherwise repeated. The advantage that the polarization generated within the resonator is not reduced due to the traversal of the beam through the birefringent $MgF_2$ is preserved in this alternative approach, although the window itself may polarize the beam less due to its being away from Brewster's angle by a substantial amount.

Figure 4:
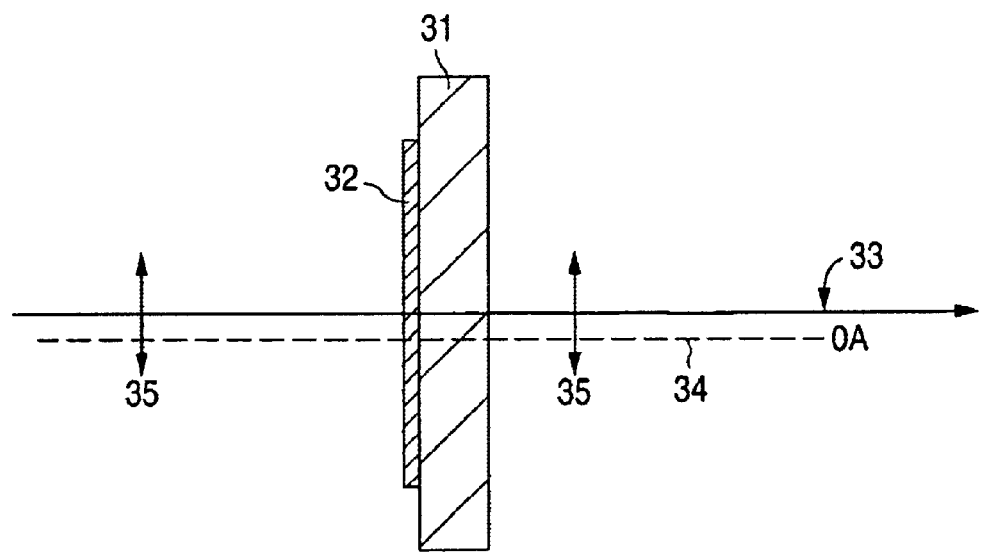
FIG. 4 schematically illustrates a laser beam transmitting a $MgF_2$ output coupler or HR mirror within a resonator of an excimer or molecular fluorine laser system according to a preferred embodiment.

FIG. 4 schematically illustrates a laser beam transmitting a $MgF_2$ substrate 31 of an output coupler or HR mirror within a resonator of an excimer or molecular fluorine laser system according to a preferred embodiment. The substrate 31 may have formed thereon a coating 32 that may be a high reflectivity (HR) coating if the element is a HR mirror, or may be an anti-reflection (AR) coating (optional) if the element is an output coupler. The beam path 33 through the substrate 32 is normal to the entrance and exit surfaces since it is desired to retro-reflect the beam from one of them. Thus, the beam does not refract and the advantage of increased polarization of the second and third embodiments set forth above with reference to FIGS. 2 and 3 is not realized. However, by cleaving the $MgF_2$ substrate along a plane so that the optical axis 34 is parallel to the beam path 33 through the substrate 31, or in this case normal to the surfaces of the substrate 31, then the polarization of the beam is preserved and advantageously not reduced. Other substrates that may be formed of $MgF_2$ and have their exit/entrance surfaces normal to the beam may be cleaved in this way, e.g., etalon plates, etc. (see above).

Figure 5:
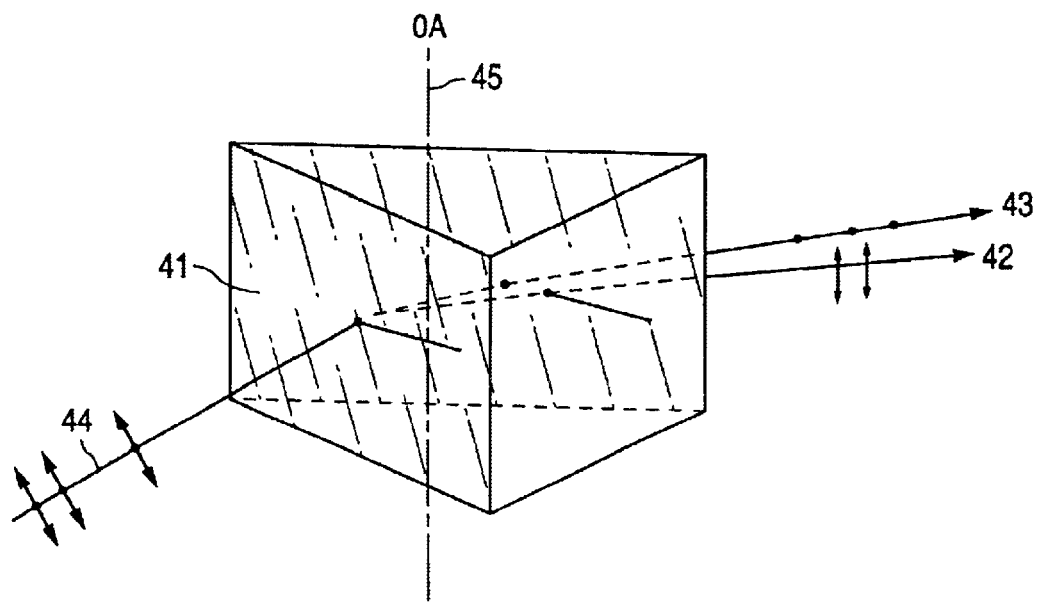
FIG. 5 schematically illustrates a laser beam transmitting a $MgF_2$ prism within a resonator of an excimer or molecular fluorine laser system according to first preferred embodiment.

FIG. 5 schematically illustrates a laser beam transmitting a $MgF_2$ prism 41 within a resonator of an excimer or molecular fluorine laser system according to a first preferred embodiment. The ordinary and extraordinary components of the beam are refracted difference amounts due to the different refractive indices of the $MgF_2$ material in this embodiment, while advantageously the unselected component is refracted outside the acceptance angle of the resonator. For example, if the back surface of the prism in FIG. 5 is a Brewster surface, or is otherwise oriented, e.g., above Brewster's angle up to 70-plus degrees and preferably between 65° and 73° as a beam expansion prism, then the π-component has a higher transmissivity than the ρ-component and is the selected component which also corresponds to the ordinary ray 43, such that at least a portion of the extraordinary ray 42 is refracted outside the acceptance angle of the resonator, thereby increasing the polarization of the beam produced by the resonator.

When the prism 41 is a beam expansion prism, then the front surface is oriented at around 90° to what is shown as the incident beam 44 for both the ordinary and extraordinary rays, 43 and 42, respectively. The optical axis 45 for the prism 41 is oriented vertically within the plane of incidence and parallel to each of the front and back surfaces of the prism 41. According to preferred resonator configurations, the beam 44 is either going toward or coming from a reflective grating and/or transmissive or reflective etalon (or other interferoemtric device, see the "803 and '398 application mentioned above), or another beam expanding prism before the etalon and/or grating of the line-narrowing module of the laser.

Figure 6:
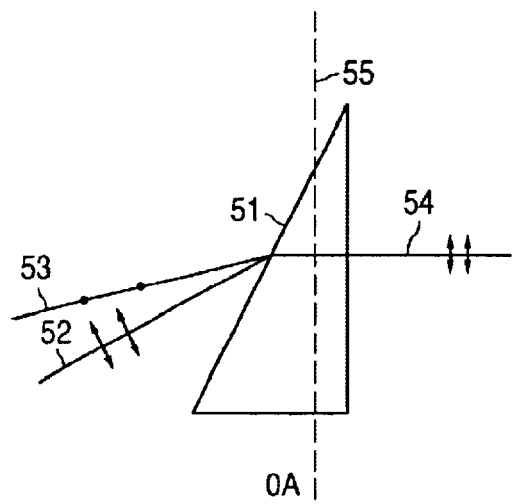
FIG. 6 schematically illustrates a laser beam transmitting a $MgF_2$ prism within a resonator or an excimer or molecular fluorine laser system according to second preferred embodiment.

FIG. 6 schematically illustrates a laser beam transmitting a $MgF_2$ prism within a resonator or an excimer or molecular fluorine laser system according to second preferred embodiment. While FIG. 5 shows a perspective view of the prism 41, FIG. 6 shows an overhead view of the prism 51, which is preferably a beam expansion prism, although the advantages of the first and second (and third) embodiments schematically illustrated at FIGS. 5–6 (and 7) may be realized when the prism 41, 51 is a dispersion prism, as well. The second embodiment is similar to the first embodiment in that the optical axis 55 is parallel to the back surface of the prism 55 or the surface through which the beam normally exits, and the optical axis 55 is perpendicular to the beam path through the $MgF_2$ material of the prism 51. The optical axis of FIG. 6 is not parallel to the other entrance/exit surface of the prism though. Also different in the case of this second embodiment, the extraordinary ray 52 is the selected π-component and the ordinary ray 53 is the ray that is preferably refracted as much as possible outside the acceptance angle of the resonator. It is noted that in FIGS. 5 and 6, respectively, the rays 42 and 43 and the rays 52 and 53 are shown separated as they exit or enter the surface of the prism that produces refraction, while the rays 42 and 43 and the rays 52 and 53 may, alternatively, or additionally, be separated in propagation direction as they exit or enter the surface through which the selected ray enters or exits normally. This second embodiment leads to an improved selection of the preferred polarization, because the resonator is configured such that only the selected one is substantially perfectly retro-reflected by, e.g., a HR-mirror or surface, or a retro-grating, of the resonator.

Figure 7:
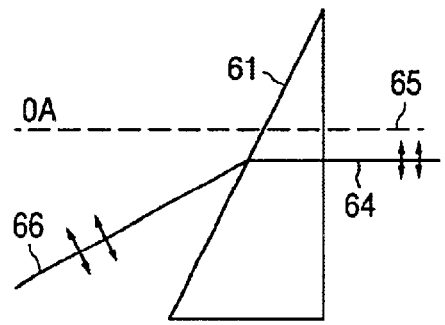
FIG. 7 schematically illustrates a laser beam transmitting a $MgF_2$ prism within a resonator or an excimer or molecular fluorine laser system according to second preferred embodiment.

FIG. 7 schematically illustrates a laser beam transmitting a $MgF_2$ prism within a resonator or an excimer or molecular fluorine laser system according to third preferred embodiment. The prism 61 of the third embodiment corresponds to the first embodiment of the window 1 schematically illustrated at FIG. 1 and to the normal incidence substrate 31 of FIG. 4 in that the beam path through the prism 61 is substantially parallel to the optical axis 65 of the $MgF_2$ material that the prism 61 is made of. In this case, the refractive indices of the ordinary and extraordinary rays of the beam 64, 66 are substantially equal, and thus the birefringent nature of the $MgF_2$ material of the prism 61 does not substantially reduce the polarization of the beam 64, 66.

In short summary with respect to the embodiments schematically illustrated and described with reference to FIGS. 1–7, using $MgF_2$ as a material making up resonator optics, instead of $CaF_2$, results in improved laser performance, particularly for high power ArF and $F_2$-lasers. For $F_2$-lasers, a higher output power is achieved. For high rep rates (e.g., 2–4 kHz or more), $MgF_2$ laser tube windows of ArF-lasers exhibit a considerably longer lifetime than $CaF_2$ windows, wherein the same advantage applies to $F_2$-lasers.

At least the following properties of $MgF_2$ advantageously contribute to the improved high power performance of the UV-excimer lasers (as compared to the more mature $CaF_2$-material). First, the lower refractive index of $MgF_2$ over that of $CaF_2$ results in lower reflection losses. Second, the greater hardness of $MgF_2$ allows an improved capacity to achieve more polished surfaces. Third, the higher Young's module of $MgF_2$ allows the optical components to tolerate higher thermal loads and induced stresses. Also, as mentioned above in some embodiment, greater polarization can be achieved according to certain component and resonator configurations.

Advantageously then, the laser tube windows do not crack or break or otherwise need to be replaced as often if they are made from $MgF_2$ than if they are made of $CaF_2$ and exposed to high power, e.g., 4 kHz and 40 W at 193 nm, radiation in continuous mode or pulse operation. Improved lifetimes of optical components allows decreased downtime for servicing and/or service cost over time. For F$_2$-lasers, the output power may be increased by 15% or more when MgF$_2$ prisms are used rather than CaF$_2$ prisms, which is very advantageous because F$_2$ lasers are otherwise typically characterized by low efficiency.

The MgF$_2$ windows advantageously are capable of withstanding more laser pulses than CaF$_2$ windows. In addition, the alignment of the windows of the laser tube can be done very conveniently by linear polarized visible light and a crossed polarizer, wherein dark means no rotation of the angle of polarization.

MgF$_2$ may also be used in a similar manner as a material for use with a mirror in an excimer or molecular fluorine laser. A MgF$_2$ prism beam expander may be used with KrF and ArF excimer lasers, as well as F$_2$-lasers.

By properly cutting/cleaving and/or orienting the MgF$_2$ elements such as prisms, windows, mirrors, etc., the birefringent nature of the MgF$_2$ will not negatively influence the polarization, and in some embodiments, can improve the polarization. If the MgF$_2$ is cut in such a manner as described above with reference to FIGS. 1, 4 and 7, it behaves like an isotropic material (similar to CaF$_2$), in the sense that linear polarization properties of laser light generated within the laser resonator are not substantially disturbed. Therefore, the useful property of high destructive resistance of MgF$_2$ can be combined with the desire for a high degree of polarization of a lithography type excimer laser such as an ArF, a KrF and/or a F$_2$-laser, particularly when operated at high power range. It may also be advantageous to use MgF$_2$ with UV and VUV solid state lasers. The MgF$_2$ material is not generally much used, because it has been considered disadvantageous due to its double refraction or birefringent nature. However, according to the preferred embodiment herein, any negative influence of the birefringence of the MgF$_2$ can be avoided by cuffing or cleaving the material in predetermined ways along predetermined planes depending on the material and resonator configuration, e.g., so that the beam bath is collinear with the optical axis where phase retardation between the two polarization orientations is not observed, as described above with reference to FIGS. 1, 4 and 7, or by utilizing the dual refraction to further select out the polarization component orthogonal to the selected component, as described above with reference to FIGS. 2–3 and 5–6.

Overall Laser System

Figure 8:
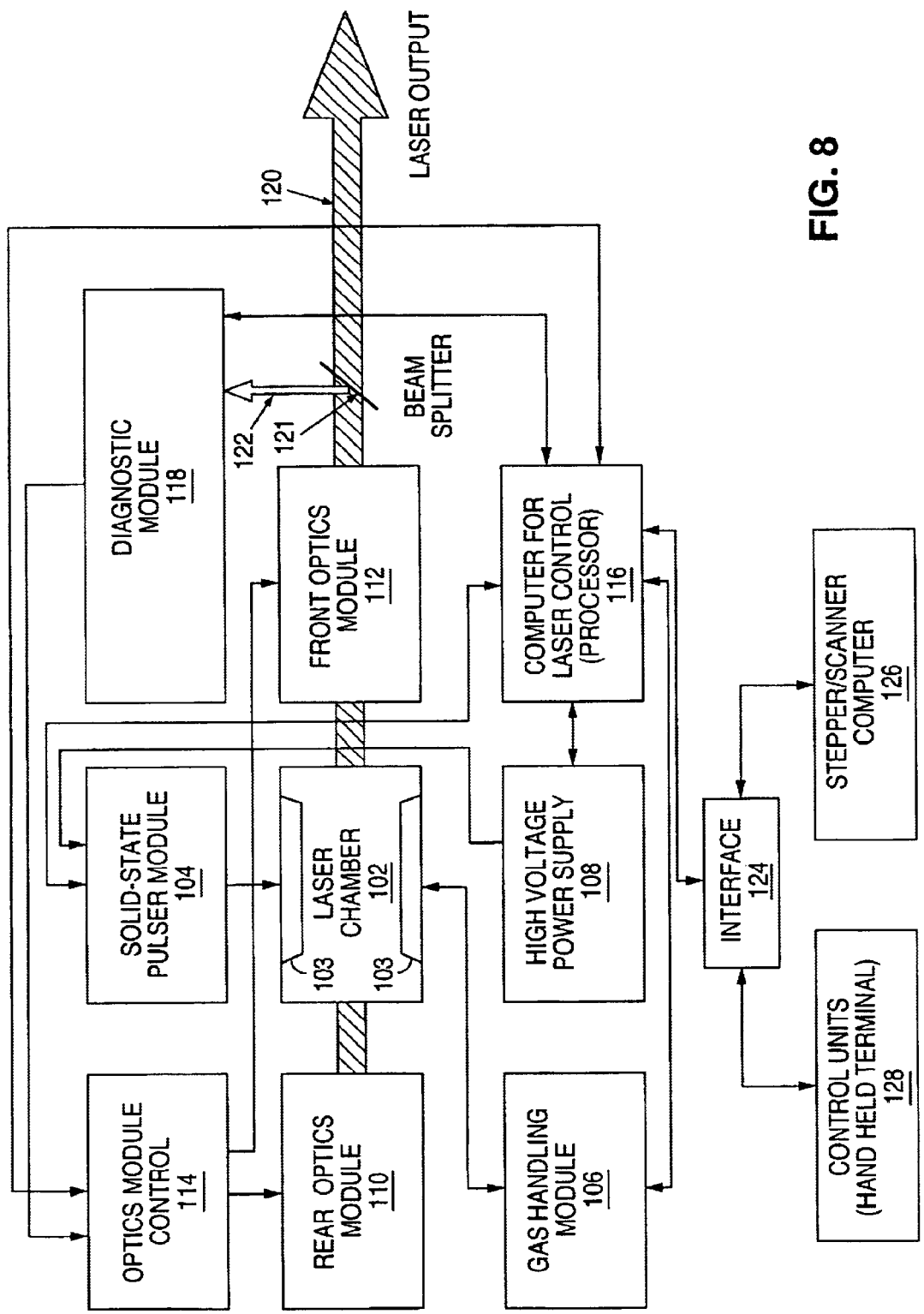
FIG. 8 schematically illustrates an excimer or molecular fluorine laser system according to a preferred embodiment.

FIG. 8 schematically illustrates an overall excimer or molecular fluorine laser system according to a preferred embodiment which preferably includes the advantageous features described above with reference to any one or a combination of the preferred and alternative embodiments schematically illustrated at FIGS. 1–7. Referring to FIG. 8, a preferred excimer or (molecular fluorine laser system is a DUV or VUV laser system, such as a KrF, ArF or molecular fluorine (F$_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 8 to meet the requirements of that application. For this purpose, alternative DUV or VUV laser system and component configurations are described at U.S. patent applications Ser. Nos. 09/317,695, 09/244,554, 09/512,417, 09/599,130, 09/694,246, 09/712,877, 09/574,921, 09/738,849, 09/718,809, 09/629,256, 09/712,367, 09/771,366, 09/715,803, 60/280,398, 09/738,849, 09/791,431, 60/204,095, 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367 and 09/780,124, and U.S. Pat. Nos. 6,285,701, 6,298,080, 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

Discharge Tube

The system shown in FIG. 8 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent applications Ser. Nos. 09/513,025, 09/780,120, 091734,459 and 09/447,882, which are assigned to the same assignee as the present application, and U.S. Pat. Nos. 4,977,573, 4,393,505 and 6,157,662, which are each hereby incorporated by reference. The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or F$_2$ lasers are used for optical lithography.

Processor Control

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor may receive signals corresponding to wavefront compensation such as values of the bandwidth, and may control the wavefront compensation performed by a wavefront compensation optic (see U.S. patent application Ser. No. 09/900,703, which is assigned to the same assignee as the present application and is hereby incorporated by reference) in a feedback loop by sending signals to adjust the pressure(s) and/or curvature(s) of surfaces associated with the wavefront compensation optic. The processor 116 also controls the line narrowing module to tune the wavelength and/or bandwidth or spectral purity, and controls the power supply and pulser module 104 and 108 to control preferably the moving average pulse power or energy, such that the energy dose at points on a workpiece is stabilized around a desired value. In addition, the computer 116 controls the gas-handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 8, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

Solid State Pulser Module

The laser chamber 102 contains a laser gas mixture and includes one or more preionization units (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units may be sliding surface or corona-type and are described U.S. patent applications Ser. No. 09/922,241 and 09/532,276 (sliding surface) and 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebraushmuster DE 295 21 572 U1, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply are described above, and further details may be described at U.S. patent application Ser. Nos. 09/640,595, 09/838,715, 60/204,095, 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Resonator, General

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. Nos. 09/715,803 and 60/280,398 applications, wherein the same optic or optics or an additional line-narrowing optic or optics for narrowing the selected line may be used. Also, particularly for the $F_2$-laser, and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 09/883,128, which is assigned to the same assignee as the present application and is hereby incorporated by reference).

The laser chamber 102 is sealed by windows transparent to the wavelengths of the emitted laser radiation 120. The windows may be preferably Brewster windows as described above, or may be aligned at another angle, e.g., 5°, to the optical path of the resonating beam. One of the windows may also serve to output couple the beam or as a highly reflective resonator reflector on the opposite side of the chamber 102 as the beam is outcoupled.

Diagnostic Module

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent applications Ser. No. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent applications Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer, and a hollow cathode lamp or reference light source for providing absolute wavelength calibration of the monitor etalon or grating spectrometer (see U.S. patent applications Ser. No. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831, 6,269,110, 6,272,158 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110, 112, gas handling module 106, power supply and pulser modules 103, 104, or other laser system component modules. For example, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosure

Particularly for the molecular fluorine laser system, and also for the ArF and KrF laser systems, an enclosure (not shown) preferably seals the beam path of the beam 120 such as to keep the beam path free of photoabsorbing or other contaminant species that can tend to attenuate and/or otherwise disturb the beam such as by providing a varying refractive index along the optical path of the beam. Smaller enclosures preferably seal the beam path between the chamber 102 and the optics modules 110 and 112 and between the beam splitter 122 and the diagnostic module 118 (see the Ser. Nos. 09/317,695, 09/594,892 and 09/598,552 applications, incorporated by reference above). The optics modules 110 and 112 are maintained in an atmosphere that is sufficiently evacuated or have an inert gas purged atmosphere. Preferred enclosures are described in detail in U.S. patent applications Ser. No. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221, 823, 5,763,855, 5,811,753 and 4,616,908, all of which are hereby incorporated by reference.

Gas Mixture

The laser gas mixture is initially filled into the laser chamber 102 in a process referred to herein as a "new fill". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent applications Ser. No. 09/513, 025, 09/447,882, 09/789,120 and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

Gas Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles.

Some preferred and alternative gas handling and/or replenishment procedures, other than as specifically described herein (see below), are described at U.S. Pat. Nos. 4,977,573, 6,212,214, 6,243,406 and 5,396,514 and U.S. patent applications Ser. No. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application); may include a gas line for injecting a premix A including 1% $F_2$:99% Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments preferably include the features set forth above at FIGS. 1–7, i.e., $MgF_2$ forms at least one optic and preferably several, for improving the lifetimes of the optics while the polarization is not adversely impacted due to the cleaving of the $MgF_2$ along a predetermined plane. For the $F_2$ laser, the optics may be used for selecting the primary line $\lambda_1$ only of multiple lines around 157 nm, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 09/900,703, which is assigned to the same assignee and is hereby incorporated by reference). Line-narrowing of the broadband emission of the ArF and/or KrF lasers may be as set forth below.

Exemplary line-narrowing optics contained in the optics module 110 include a beam expander, an optional interferometric device such as an etalon or a device having a pair of opposed non-planar reflection plates such as may be described in the Ser. Nos. 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. Nos. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Additional Laser System Features

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110, 112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as $\mu$HIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at excimer or molecular fluorine laser wavelengths such as 248 nm for the KrF laser, 193 nm for the ArF laser and 157 nm for the $F_2$ laser. The materials are also capable of withstanding long-term exposure to ultraviolet light with minimal degradation effects. Examples of such materials are $CaF_2$, $MgF_2$, BaF2, LiF and $SrF_2$, and in some cases fluorine-doped quartz may be used, and for the KrF laser, fused silica may be used. According to preferred embodiments described in more detail above, one or more optics of the laser resonator comprise $MgF_2$ wherein the material is cut along a selected plane to that the optical axis either is approximately parallel to the beam path through the material or so that the optical axis is approximately perpendicular to the beam path, and the resonator is configured to reject at least a portion of the non-selected polarization component. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent applications Ser. Nos. 09/599,130 and 09/923,770, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. An excimer or molecular fluorine laser system, comprising:
    a discharge chamber filled with a laser gas mixture at least including a halogen-containing molecular species and a buffer gas and including a window comprising $MgF_2$;
    a plurality of electrodes within the discharge chamber connected to a discharge circuit for energizing the gas mixture; and
    a resonator for generating a laser beam;
    wherein said $MgF_2$ window is oriented such that the crystallographic c-axis of the $MgF_2$ material is at least approximately parallel to a beam path through the $MgF_2$ window so that ordinary and extraordinary components are refracted approximately a same amount and traverse approximately a same beam path through the window.

2. The laser system of claim 1, wherein said discharge chamber comprises a second $MgF_2$ window oriented such that the crystallographic c-axis of the $MgF_2$ material is at least approximately parallel to a beam path through the second $MgF_2$ window.

3. The laser system of claim 2, wherein each of said $MgF_2$ windows includes a pair of at least approximately parallel surfaces oriented at least approximately at Brewster's angle to said beam path through said $MgF_2$ windows, and wherein each said $MgF_2$ window has been previously cleaved along a predetermined plane, such that when said surfaces of said windows are oriented at Brewster's angle to the beam paths, then their crystallographic c-axes are approximately parallel to the beam paths.

4. The laser system of claim 1, wherein said $MgF_2$ window includes a pair of approximately parallel surfaces oriented approximately at Brewster's angle to said beam path through said $MgF_2$ window, and wherein said $MgF_2$ window has been previously cleaved along a predetermined plane, such that when said surfaces of said window are oriented approximately at Brewster's angle to the beam path, then its crystallographic c-axis is approximately parallel to the beam path.

5. The laser system of claim 4, further comprising a partially reflecting output coupler comprising an $MgF_2$ substrate oriented such that the crystallographic c-axis of the $MgF_2$ material of the output coupler is at least approximately parallel to a beam path through said output coupler.

6. The laser system of claim 5, wherein said $MgF_2$ substrate of said output coupler includes a pair of at least approximately parallel surfaces oriented at least approximately normal to said beam path through said output coupler, and wherein said $MgF_2$ substrate has been previously cleaved along a predetermined plane, such that when said surfaces of said substrate are normally oriented to the beam path, then its crystallographic c-axis is approximately parallel to the beam path through the output coupler.

7. The laser system of claim 4, further comprising a highly reflecting (HR) mirror comprising an $MgF_2$ substrate oriented such that the crystallographic c-axis of the $MgF_2$ material of the HR mirror is at least approximately parallel to a beam path through said substrate of said mirror prior to reflection at a reflecting surface of said mirror.

8. The laser system of claim 7, wherein said $MgF_2$ substrate of said HR mirror includes a pair of at least approximately parallel surfaces oriented at least approximately normal to said beam path through said substrate of said HR mirror, and wherein said $MgF_2$ substrate of said HR mirror has been previously cleaved along a predetermined plane, such that when said surfaces of said substrate of said mirror are normally oriented to the beam path, then its crystallographic c-axis is approximately parallel to the beam path through the substrate of said mirror.

9. The laser system of claim 4, further comprising a prism comprising $MgF_2$ oriented such that the crystallographic c-axis of the $MgF_2$ material of the prism is at least approximately perpendicular to a beam path through said prism.

10. The laser system of claim 9, wherein said prism includes an entrance face and an exit face, and wherein said prism has been previously cleaved along a predetermined plane, such that when said beam traverses said prism, then its crystallographic c-axis is approximately perpendicular to the beam path through the prism.

11. The laser system of claim 1, further comprising a partially reflecting output coupler comprising a $MgF_2$ substrate oriented such that the crystallographic c-axis of the $MgF_2$ material of the output coupler is at least approximately parallel to a beam path through said output coupler.

12. The laser system of claim 11, wherein said $MgF_2$ substrate of said output coupler includes a pair of at least approximately parallel surfaces oriented at least approximately normal to said beam path through said output coupler, and wherein said $MgF_2$ substrate has been previously cleaved along a predetermined plane, such that when said surfaces of said substrate are normally oriented to the beam path, then its crystallographic c-axis is approximately parallel to the beam path through the output coupler.

13. The laser system of claim 11, further comprising a highly reflecting (HR) mirror comprising an $MgF_2$ substrate oriented such that the crystallographic c-axis of the $MgF_2$ material of the HR mirror is at least approximately parallel to a beam path through said substrate of said mirror prior to reflection at a reflecting surface of said mirror.

14. The laser system of claim 13, wherein said $MgF_2$ substrate of said HR mirror includes a pair of at least approximately parallel surfaces oriented at least approximately normal to said beam path through said substrate of said HR mirror, and wherein said $MgF_2$ substrate of said HR mirror has been previously cleaved along a predetermined plane, such that when said surfaces of said substrate of said mirror are normally oriented to the beam path, then its crystallographic c-axis is approximately parallel to the beam path through the substrate of said mirror.

15. The laser system of claim 13, further comprising a prism comprising $MgF_2$ oriented such that the crystallographic c-axis of the $MgF_2$ material of the prism is at least approximately perpendicular to a beam path through said prism.

16. The laser system of claim 15, wherein said prism includes an entrance face and an exit face, and wherein said prism has been previously cleaved along a predetermined plane, such that when said beam traverses said prism, then its crystallographic c-axis is approximately perpendicular to the beam path through the prism.

17. The laser system of claim 11, further comprising a prism comprising $MgF_2$ oriented such that the crystallographic c-axis of the $MgF_2$ material of the prism is at least approximately perpendicular to a beam path through said prism.

18. The laser system of claim 17, wherein said prism includes an entrance face and an exit face, and wherein said prism has been previously cleaved along a predetermined plane, such that when said beam traverses said prism, then its crystallographic c-axis is approximately perpendicular to the beam path through the prism.

19. The laser system of claim 1, further comprising a highly reflecting (HR) mirror comprising an $MgF_2$ substrate oriented such that the crystallographic c-axis of the $MgF_2$ material of the HR mirror is at least approximately parallel to a beam path through said substrate of said mirror prior to reflection at a reflecting surface of said mirror.

20. The laser system of claim 19, wherein said $MgF_2$ substrate of said HR mirror includes a pair of at least approximately parallel surfaces oriented at least approximately normal to said beam path through said substrate of said HR mirror, and wherein said $MgF_2$ substrate of said HR mirror has been previously cleaved along a predetermined plane, such that when said surfaces of said substrate of said mirror are normally oriented to the beam path, then its crystallographic c-axis is approximately parallel to the beam path through the substrate of said mirror.

21. The laser system of claim 19, further comprising a prism comprising $MgF_2$ oriented such that the crystallographic c-axis of the $MgF_2$ material of the prism is at least approximately perpendicular to a beam path through said prism.

22. The laser system of claim 21, wherein said prism includes an entrance face and an exit face, and wherein said prism has been previously cleaved along a predetermined plane, such that when said beam traverses said prism, then its crystallographic c-axis is approximately perpendicular to the beam path through the prism.

23. The laser system of claim 1, further comprising a prism comprising $MgF_2$ oriented such that the crystallographic c-axis of the $MgF_2$ material of the prism is at least approximately perpendicular to a beam path through said prism.

24. The laser system of claim 23, wherein said prism includes an entrance face and an exit face, and wherein said prism has been previously cleaved along a predetermined plane, such that when said beam traverses said prism, then its crystallographic c-axis is approximately perpendicular to the beam path through the prism.

25. The laser system of claim 1, wherein the $MgF_2$ window is a partially reflecting output coupler.

* * * * *